US006305894B1

(12) United States Patent
Dearborn

(10) Patent No.: US 6,305,894 B1
(45) Date of Patent: Oct. 23, 2001

(54) ROUND BALE TRANSPORT DEVICE

(76) Inventor: Mark K. Dearborn, 19688 270th St., Bloomfield, IA (US) 52537

( * ) Notice: Subject to any disclaimer, the term of this patent is extended or adjusted under 35 U.S.C. 154(b) by 0 days.

(21) Appl. No.: 09/803,297

(22) Filed: Mar. 9, 2001

(51) Int. Cl.[7] .......... B60P 1/04
(52) U.S. Cl. .......... 414/24.5; 414/436; 414/546
(58) Field of Search .......... 414/24.5, 24.6, 414/436, 442, 460, 546, 721

(56) References Cited

U.S. PATENT DOCUMENTS

| | | | | |
|---|---|---|---|---|
| 3,935,954 | | 2/1976 | Woods et al. . | |
| 4,179,034 | | 12/1979 | Van Antwerp et al. . | |
| 4,215,963 | | 8/1980 | Doner . | |
| 4,288,191 | | 9/1981 | Lynch . | |
| 4,348,143 | | 9/1982 | Hedgespeth . | |
| 4,364,701 | | 12/1982 | Lynch et al. . | |
| 4,527,935 | | 7/1985 | Fortenberry . | |
| 5,013,202 | * | 5/1991 | Love | 414/24.5 |
| 5,257,885 | | 11/1993 | Reil . | |
| 5,496,144 | * | 3/1996 | Wetz | 414/24.5 |
| 5,873,694 | | 2/1999 | Osborn, Jr. et al. . | |

* cited by examiner

*Primary Examiner*—Janice L. Krizek
(74) *Attorney, Agent, or Firm*—Zarley, McKee, Thomte, Voorhees & Sease

(57) ABSTRACT

A hay bale carrier has a horizontal U-shaped wheel supported frame. The frame is comprised of separate parallel arms, with the arms being connected by a forward cross beam. A hollow tongue extends forwardly from the frame and has an elongated tongue member slidably mounted therein with its forward end protruding from the forward end of the tongue. A post structure is pivotally secured to the cross beam and has at least one bale penetrating bar secured thereto and extending in a rearward direction. A first pulley is located on the upper end of the post structure, a second pulley is located on the forward end of the tongue, and a third pulley is located rearwardly of the tongue. An elongated cable has one end secured to the tongue and is thence threadable about the first, second and third cables with a second end secured to the tongue member.

4 Claims, 7 Drawing Sheets

ROUND BALE TRANSPORT DEVICE

BACKGROUND OF THE INVENTION

In modern times, hay is baled in large round or square bales that weigh a half ton or more. After the bales are created by conventional baling machines, they are deposited in the hay field and must be picked up thereafter for storing or for feeding purposes. Small pick up trucks and light tractors may not have hydraulic systems or sufficient horsepower to enable these heavy bales to be moved. In some areas of the United States, farms are still operated through the use of horses. Horse drawn equipment is not designed to lift and carry bales of the above described magnitude.

Therefore, it is a principal object of this invention to provide a bale transport device that will lift and carry a heavy bale without recourse to hydraulic or other auxiliary power systems.

These and other objects will be apparent to those skilled in the art.

SUMMARY OF THE INVENTION

A hay bale carrier has a horizontal U-shaped wheel supported frame. The frame is comprised of separate parallel arms, with the arms being connected by a forward cross beam.

A hollow tongue extends forwardly from the frame and has an elongated tongue member slidably mounted therein with its forward end protruding from the forward end of the tongue. A post structure is pivotally secured to the cross beam and has at least one bale penetrating bar secured thereto and extending in a rearward direction. A first pulley is located on the upper end of the post structure, a second pulley is located on the forward end of the tongue, and a third pulley is located rearwardly of the tongue. An elongated cable has one end secured to the tongue and is thence threadable about the first, second and third pulley with a second end secured to the tongue member whereby the post structure can be pivoted with respect to the frame when the tongue member is pulled outwardly from the tongue.

DESCRIPTION OF THE PREFERRED EMBODIMENT

Figure 1:
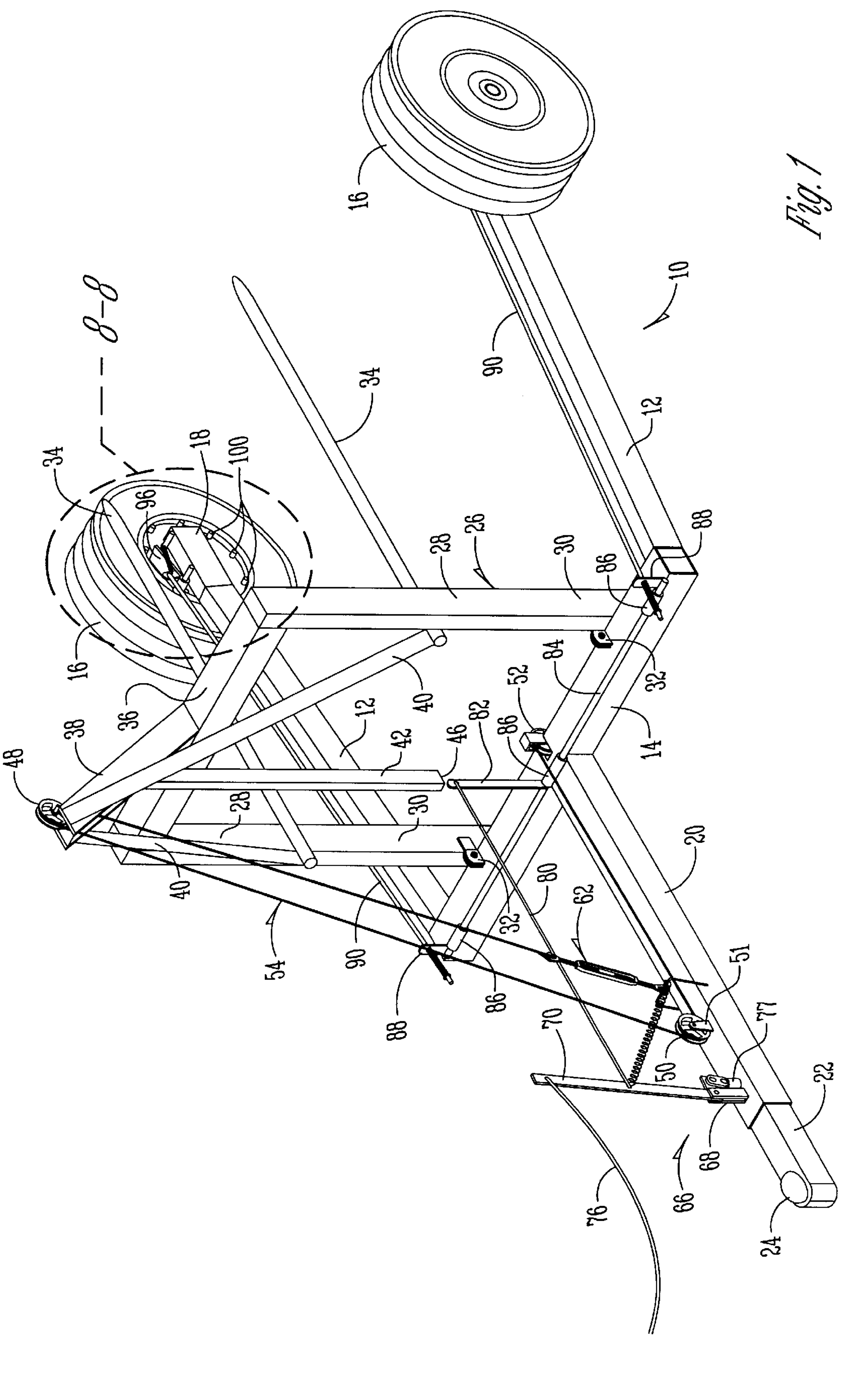
FIG. 1 is a perspective view of the device of this invention.

With reference to FIG. 1, a horizontal U-shaped frame 10 is comprised of two spaced parallel rearwardly extending arms 12 which extend from the opposite ends of horizontal cross beam 14. Ground wheels 16 are rotatably secured by any convenient means to the rearward ends of arms 12. The numeral 18 designates the rearward ends of arms 12.

A hollow tongue 20 is secured by its rearward end to the center of cross beam 14. A tongue member 22 is slidably mounted within tongue 20 and has a hitch 24 on the forward end thereof.

A post structure or frame 26 is comprised of two spaced parallel upright posts 28 having lower ends 30. Hinge brackets 32 pivotally connect the beam 14 to the post structure 26 (FIG. 1). Horizontal bale penetrating bars 34 are welded to or otherwise secured to the mid-point of post 28. A horizontal frame member 36 is rigidly secured to the upper end of post 28.

A diagonally disposed frame channel 38 is secured by its lower end to the top center of frame member 36. A pair of diagonal braces 40 are secured to the frame channel 38 and extend downwardly for connection to the upright posts 28 (FIG. 1).

Figure 2:
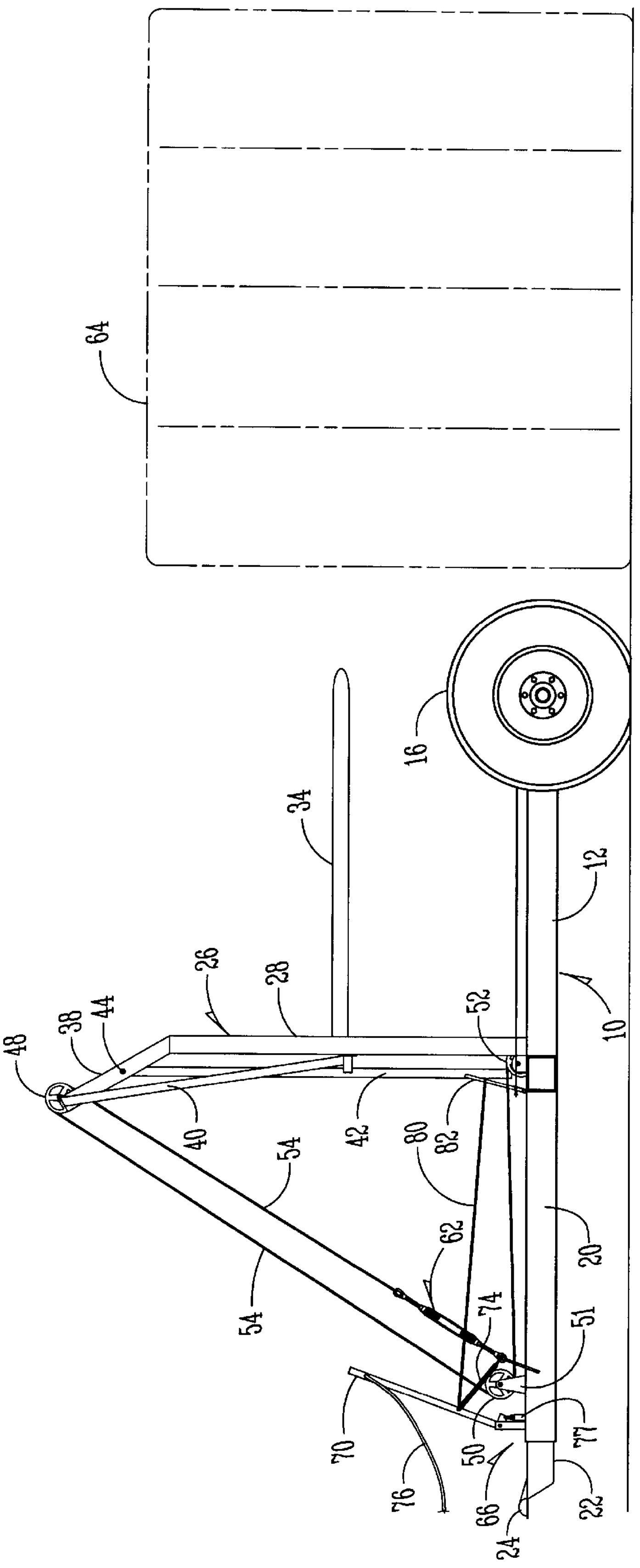
FIG. 2 is a side elevational view thereof before a bale is loaded.
Figure 3:
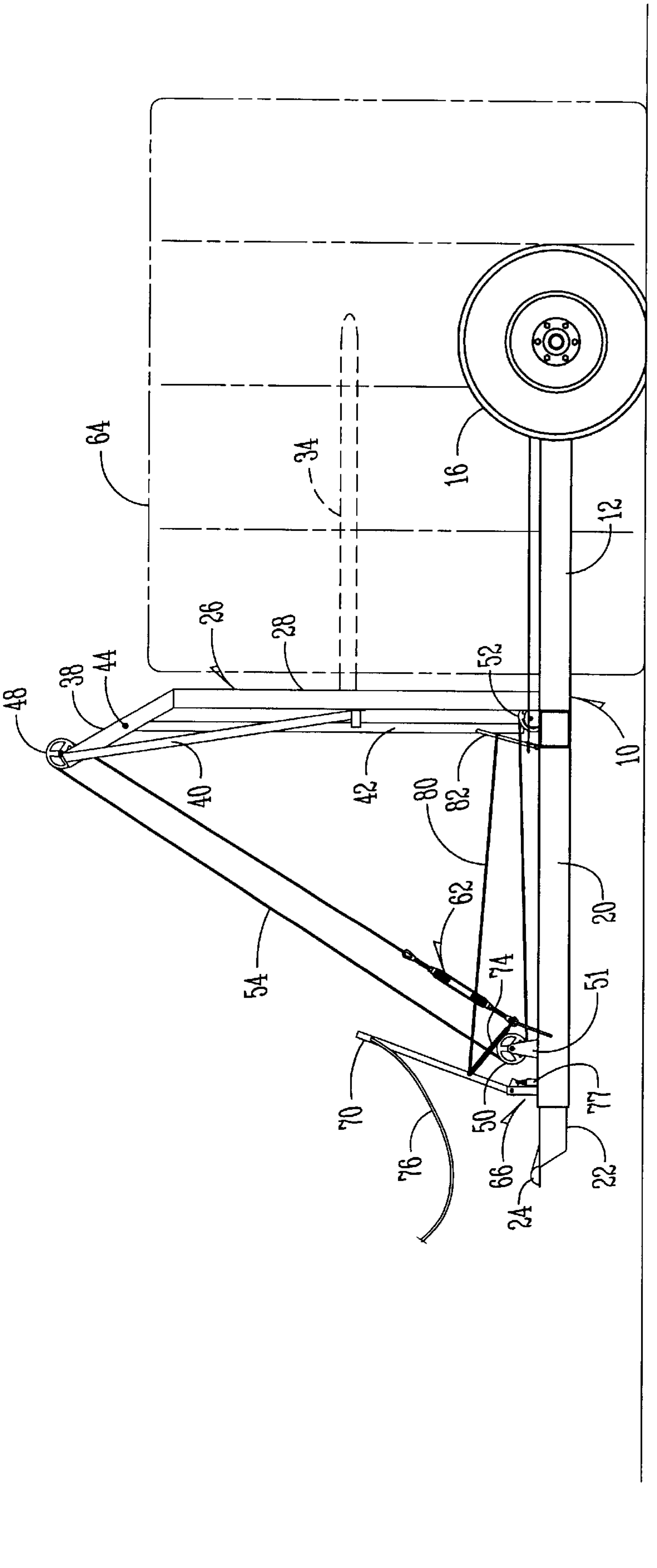
FIG. 3 is a view similar to that of FIG. 2 but shows the device when the bale is initially loaded.
Figure 4:
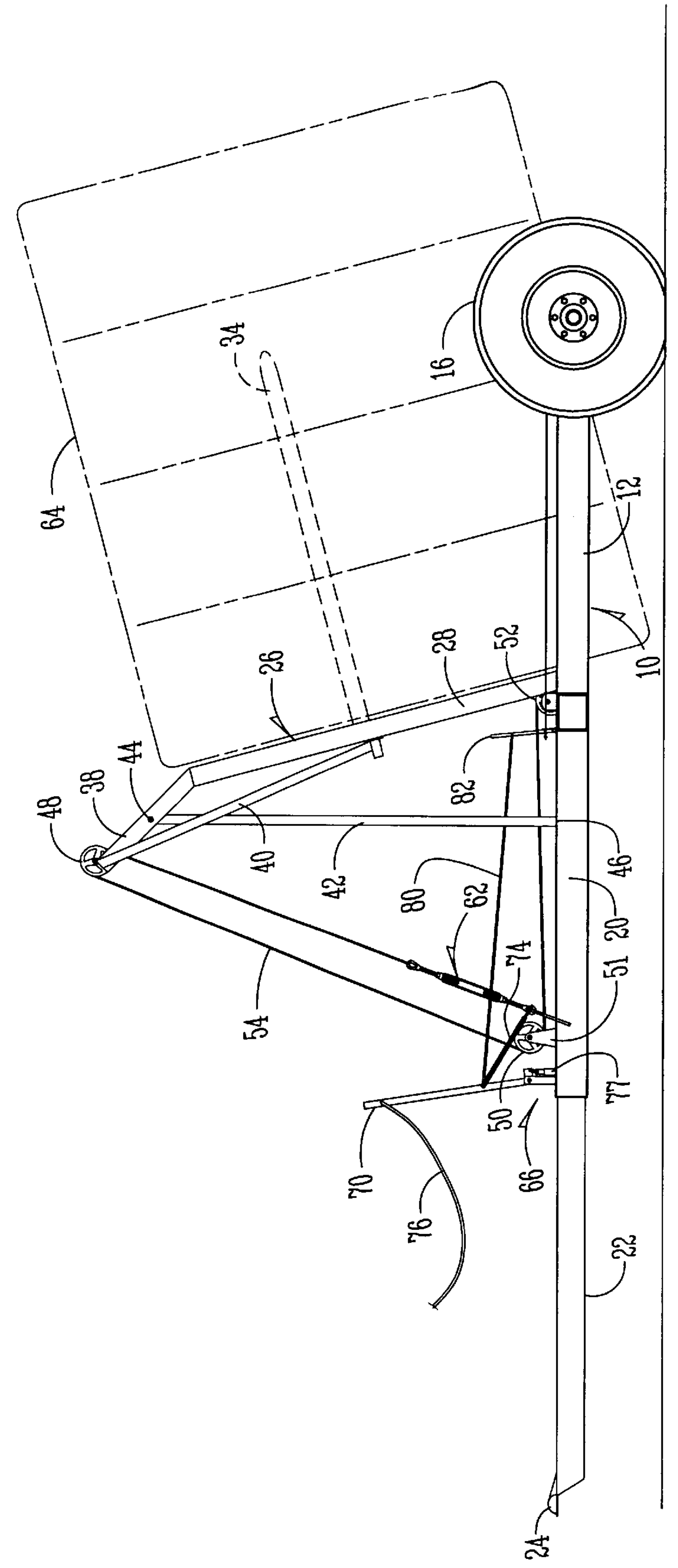
FIG. 4 is an elevational view similar to that of FIG. 3 but shows how the bale is raised and tilted for transport purposes.

A normally vertical brace member 42 is pivotally secured by pin 44 to frame channel 38 (FIGS. 2 and 3). The lower end 46 of brace 42 is adapted to swing forwardly and engage the upper surface of tongue 20 when the bale is lifted from the ground as shown in FIG. 4.

Figure 5:
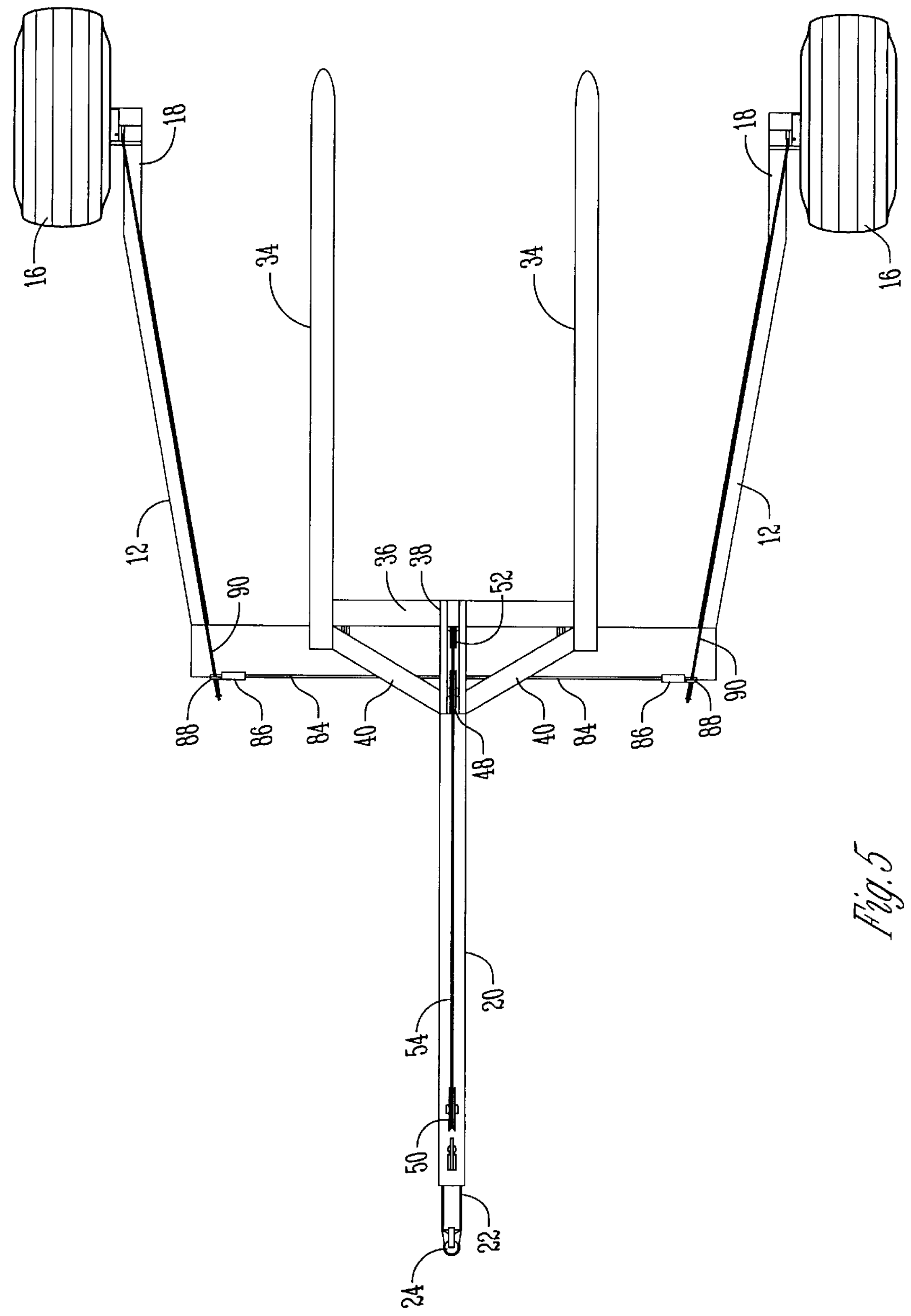
FIG. 5 is a plan view of the device of FIG. 1.
Figure 7:
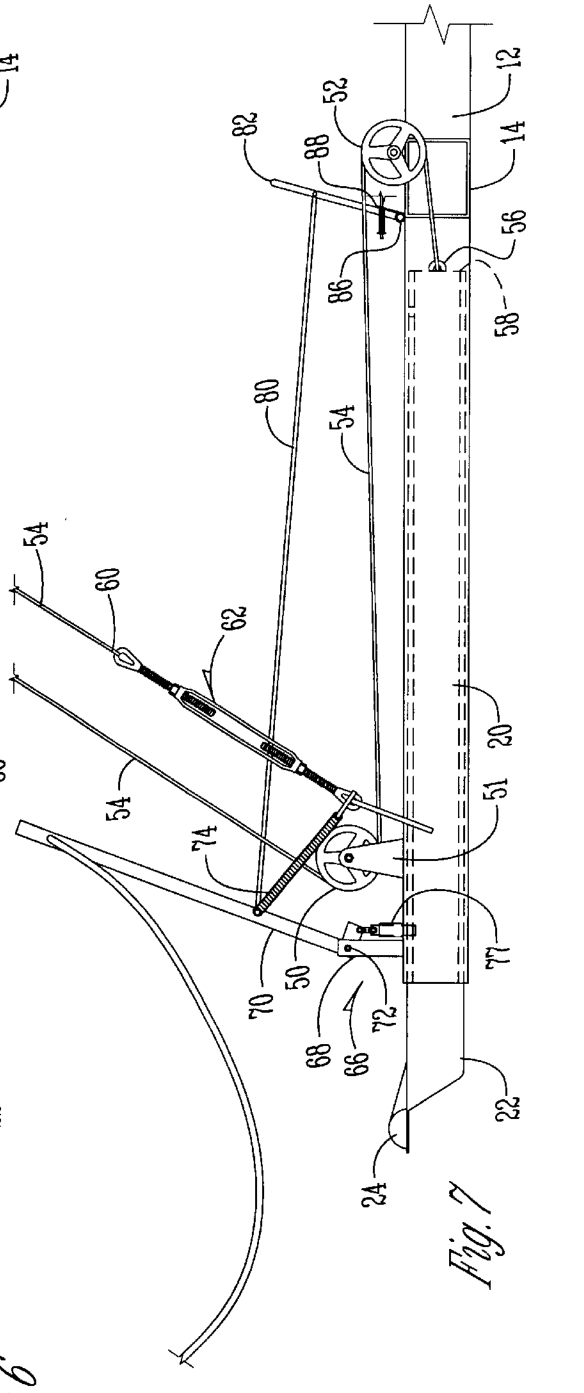
FIG. 7 is a sectional view similar to that of FIG. 6 but shows the tongue member withdrawn into the tongue.

A first pulley 48 is rotatably mounted on the upper end of frame channel 38. A second pulley 50 is rotatably mounted on bracket 51 located on the forward end of tongue 20. (FIG. 3). A third pulley 52 is rotatably mounted at the center of cross beam 14 immediately behind the rearward end of tongue 20. An elongated cable 54 has a first end 56 secured to the rearward end of tongue member 22 (FIG. 7). The cable 54 then extends over the pulley 52 and then forwardly over the tongue member around pulley 50; thence upwardly around pulley 48; and thence downwardly for connection to tongue 20 by means of belt tightener assembly 62 (FIG. 1). A conventional round bale 64 is shown in FIGS. 4 and 5.

A latch mechanism 66 is pivotally secured to bracket 68 on the forward end of tongue 22. The latch mechanism 66 further comprises an L-shaped lever 70 which is pivotally secured to bracket 68 by pin 72 (FIG. 7). A tension spring 74 has one end connected to lever 70 and the other end connected to cable tightener assembly 62 to maintain the lever 70 in the position shown in FIG. 7. A line 76 is secured to the upper end of lever 70 and extends forwardly to permit movement of the lever 70 from a remote position forwardly of the device. A lock pin 77 is secured to the lower end of L-shaped lever 70 and is adapted to be raised and lowered by the pivotal movement of lever 70 into and out of aligned locking apertures (not shown) in tongue 20 and tongue member 22. A similar aperture (not shown) is near the rearward end of tongue member 22.

Figure 8:
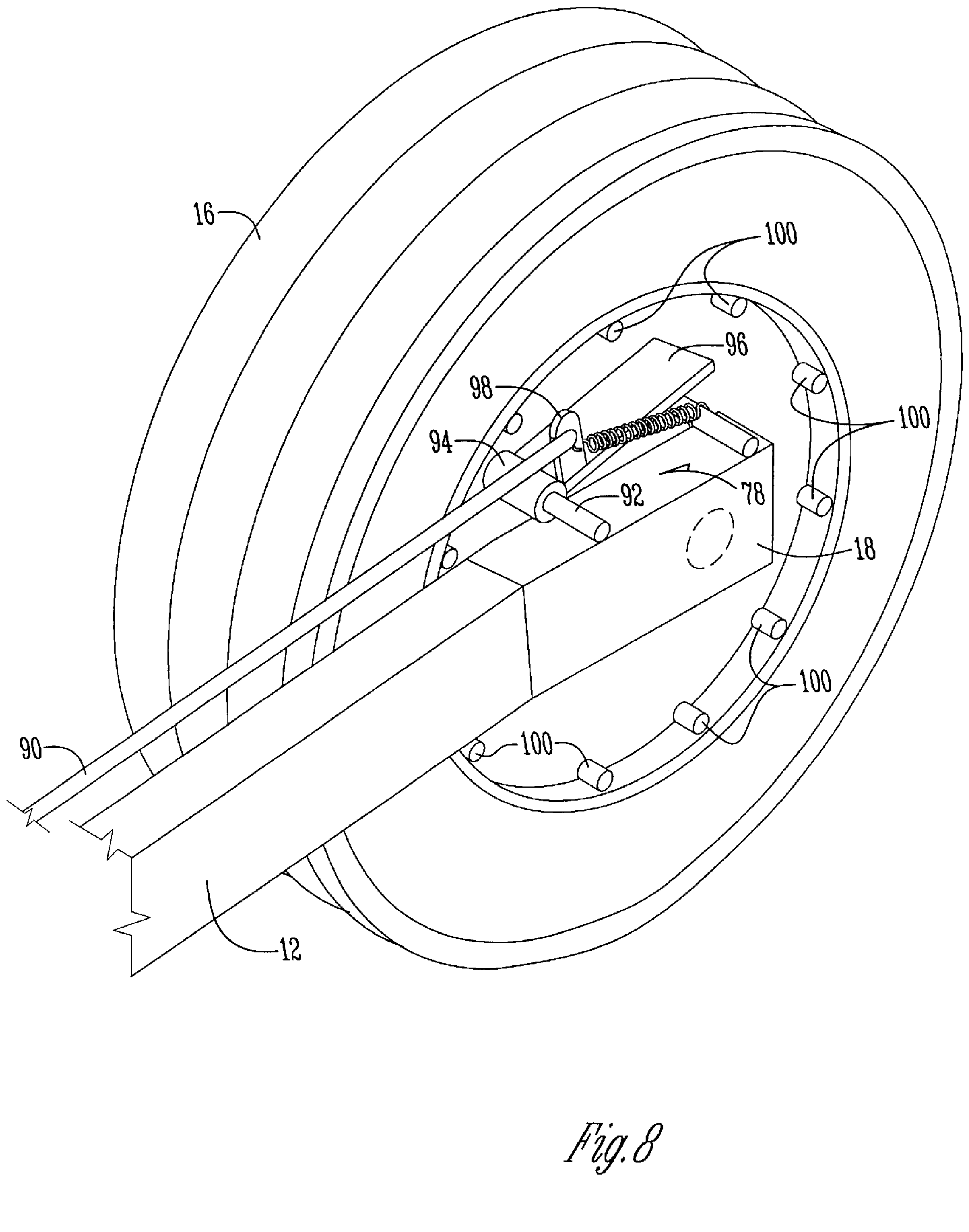
FIG. 8 is an enlarged scale sectional view of the brake system attached to one of the wheels.

A brake mechanism 78 is shown in FIG. 8. A rod 80 extends rearwardly from pivotal attachment to lever 70 and has its rearward end pivotally connected to a lever 82 rigidly mounted on its lower end to a transverse shaft 84 (FIG. 1). Shaft 84 is pivotally mounted for rotation about its elongated axis by bearings 86 mounted on the top of cross beam 14. Bars 88 (FIG. 1) are rigidly secured to the ends of shaft 84. Elongated rods 90 extend through suitable apertures in bars 88 and extend rearwardly towards the wheels 16. As best shown in FIG. 8, a shaft 92 is welded or otherwise secured to the rearward end 18 of each arm 12. The shaft extends laterally across the arm 12. A bearing 94 is rotatably mounted on a protruding end of shaft 92. A bar 96 is welded at a forward end to bearing 94 and extends rearwardly therefrom. An upstanding flange 98 is welded to the bar 96 and pivotally receives a rearward end of bar 90. When the apparatus is in the position shown in FIG. 3, the lever 70 is in the position of FIGS. 3 and 7. When the operator pulls line 76, lever 70 pivots forwardly which pulls the rod 80 in a forwardly direction to pivot the lever 82 in a counter-clockwise direction as viewed in FIG. 7. This movement of lever 82 rotates the transverse shaft 84 in a counter-clockwise direction as viewed in FIG. 7, which in turn causes the bars 88 to pull the rods 90 in a forward direction. With reference to FIG. 8, the forward movement of rod 90 pivots the bar 96 to an upward position where it binds against any one of the lugs 100 on the rim of wheel 16 to lock the wheel against rotation.

As tongue member 22 is pulled out of tongue 20, (FIG. 6), member 42 swings forwardly so that its lower end 46 binds against the top of tongue 20 (FIG. 4), and serves as a transport lock. When the tongue member 22 is in the position of FIG. 6, the locking pin 77 snaps into the aperture (not shown) on the rearward end of tongue member 22 through the energy of spring 74. This causes the rod 80 to be pushed rearwardly which reverses the braking action described above.

In operation, the device in the configuration of FIG. 2 is backed towards the bale 64 whereupon the wheel 16 and arms 12 move past the sides of the bale 64 while the bars 34 penetrate the bale. It should be noted that the post structure 26 is in a substantial vertical position in both FIGS. 2 and 3.

Figure 6:
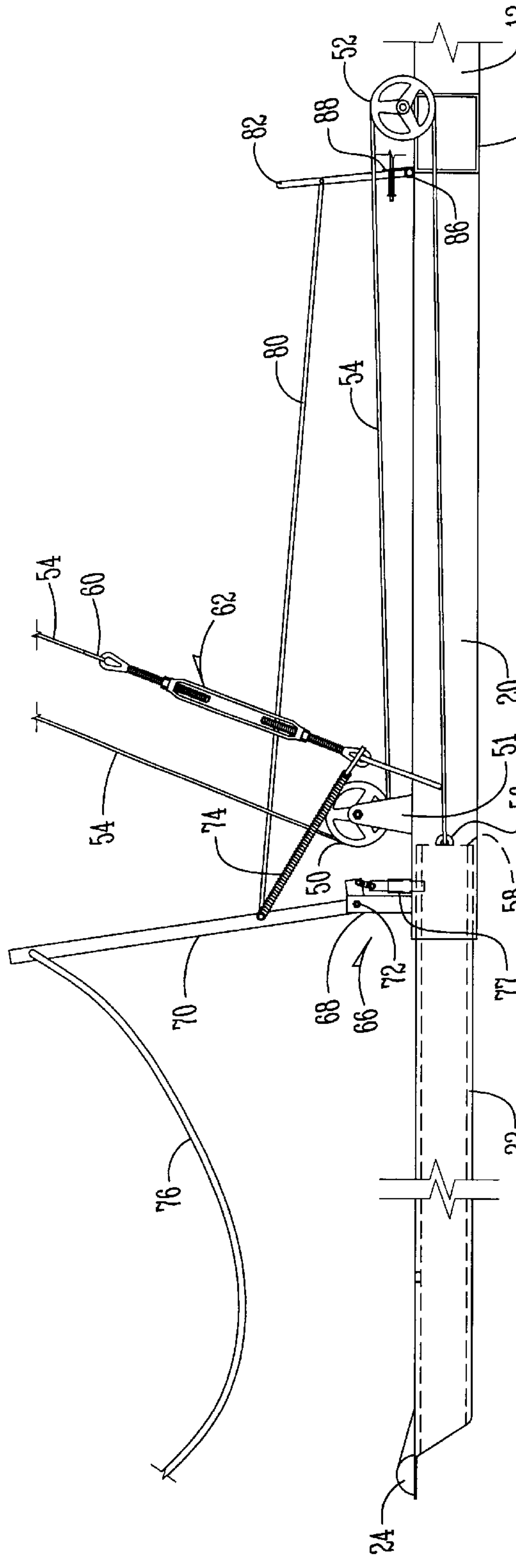
FIG. 6 is an elongated sectional view of the tongue and tongue member when the tongue member is extended from the tongue.

The operator then pulls on the line 76 to move the lever 70 from the rearwardly extending position to the forwardly extending position of FIG. 6. This pulls the locking pin 77 which locks tongue 20 to tongue member 22, and frees the tongue member 22 for longitudinal sliding movement out of the tongue 20. A conventional latch (not shown) on cross beam 14 holds frame 26 in an erect position, and is released when line 76 is pulled to set the brakes and when the locking pin 77 is pulled to release tongue member 22. The operator then drives the team of horses, pick up, or tractor forwardly to pull the tongue member 22 out of the tongue 20 to the position of FIG. 6. The forward movement of the tongue member 22 in the tongue 20 causes the cable end 56 to move forwardly from the position of FIG. 7 to the position of FIG. 6. At this point, the wheels 16 become unlocked as described above since the brake linkage including the bar 96 moves in directions opposite to the braking procedure. This pulling action on the end 56 of cable 54 exerts a turning moment on the upper end of post structure 26 through the cable being threaded over the pulleys 48, 50 and 52. This causes the frame structure 26 to tilt forwardly as shown in FIG. 4, thus exerting a lifting force on the bale 64 through the bars 34.

It should be noted that the brake mechanism 78, as described above, is in effect while the device is in the configuration shown in FIG. 3 and until the tongue 20 and tongue member 22 are in the configuration shown in FIG. 6, at which time the brake mechanism is released, as described above.

From the foregoing, it is seen that the device of this invention will permit an extremely large and heavy bale to be lifted and transported by a prime mover consisting of a team of horses, a light pick up or a light tractor. It is therefore seen that this invention will achieve at least all of its stated objectives.

What is claimed is:

1. A hay bale carrier, comprising, a horizontal U-shaped frame having two parallel spaced arms with forward and rearward ends, a horizontal cross beam connected to the forward ends of the arms, a ground wheel connected to the rearward ends of each of the arms, a forwardly extending hollow tongue having forward and rearward ends and being rigidly connected by its rearward end to the cross beam, a telescopic tongue member slidably mounted in the tongue and having forward and rearward ends with the forward end protruding from the forward end of the tongue, a hitch on the forward end of the tongue member, a substantially vertical post structure having upper and lower ends pivotally secured by the lower end to the cross beam and adapted to pivot in a vertical plane passing through the tongue and the tongue member, at least one bale penetrating bar secured to the post structure and extending rearwardly therefrom, a first pulley on the upper end of the post structure, a second pulley on the forward end of the tongue, a third pulley on the cross beam, an elongated cable having one end secured to the rearward end of the tongue member within the tongue, and thence being threadable around the third, second and first pulleys with a second end being secured to the tongue, whereby the movement of the tongue member outwardly from the tongue will cause the post structure to pivot forwardly from a substantially vertical position to a forwardly inclined position to simultaneously lift the bale penetrating bar from a substantially horizontal position to a rearwardly extending inclined position so as to elevate a bale penetrated by the penetrating bar.

2. The hay bale carrier of claim 1 wherein a movable latch element is mounted on the tongue to permit selective locking of the tongue member when the tongue member is located in its extended or retracted positions with respect to the tongue.

3. The hay bale carrier of claim 1 wherein a movable latch member is mounted on the tongue and operatively connected to the tongue member therein to selectively releasably lock the tongue member in a fixed position within the tongue, and to alternately free the tongue member for outwardly slidable movement out of the forward end of the tongue.

4. The hay bale carrier of claim 3 wherein a brake mechanism is associated with each of the wheels, and linkage means connecting the brake mechanism and latch member to cause the brake mechanism to lock the wheels against movement during the period of time that the tongue member is moving out of the tongue and while the post structure is pivoting forward to elevate a bale penetrated by the penetrating bar.

* * * * *